United States Patent
Hufnagel et al.

(10) Patent No.: US 8,108,206 B2
(45) Date of Patent: Jan. 31, 2012

(54) AUTO-GENERATED TO-DO LIST

(75) Inventors: Mark R. Hufnagel, Morrisville, NC (US); Tyler S. Lacock, Morrisville, NC (US); Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 12/166,130

(22) Filed: Jul. 1, 2008

(65) Prior Publication Data

US 2010/0004921 A1    Jan. 7, 2010

(51) Int. Cl.
*G06F 17/27* (2006.01)

(52) U.S. Cl. ................... 704/9; 704/257; 704/4

(58) Field of Classification Search ............... 704/1–10, 704/251, 252, 254, 257, 270, 272, 270.1
See application file for complete search history.

(56) References Cited

U.S. PATENT DOCUMENTS

| 7,496,500 B2 * | 2/2009 | Reed et al. ............... 704/9 |
| 7,885,844 B1 * | 2/2011 | Cohen et al. ............. 1/1 |

* cited by examiner

*Primary Examiner* — Huyen X. Vo
(74) *Attorney, Agent, or Firm* — DeLizio Gilliam, PLLC

(57) ABSTRACT

Methods, systems, and computer readable media for providing an auto-generated to-do list are described. Text is received in an instant messenger conversation, wherein the text comprises a task sender, a task body, and a task date, and an input is received selecting a selection of the text, wherein the selection comprises the task body. The text is analyzed to identify the task sender, the task body, and the task date. The task is then entered into the to-do list, wherein the task comprises the task sender, the task body, and the task date, thereby providing an auto-generated to-do list.

35 Claims, 3 Drawing Sheets

AUTO-GENERATED TO-DO LIST

BACKGROUND OF THE INVENTION

With today's workforce being spread across the globe, many employees interact with each other in real-time via instant messaging services. During these interactions, employees are often assigned tasks to complete with specific deadlines. It is then up to the employee to add that task to their own calendar or to-do list to ensure that the task gets completed on time. With this approach, employees often forget to add the task to their to-do lists in a timely fashion, and can forget the context of the assignment when they endeavor to complete it later. This can lead to the task being performed incorrectly, or being forgotten entirely.

BRIEF SUMMARY OF THE INVENTION

Methods, systems, and computer readable media for providing an auto-generated to-do list are described. Text is received in an instant messenger conversation, wherein the text comprises a task sender, a task body, and a task date, and an input is received selecting a selection of the text, wherein the selection comprises the task body. The text is analyzed to identify the task sender, the task body, and the task date. The task is then entered into the to-do list, wherein the task comprises the task sender, the task body, and the task date, thereby providing an auto-generated to-do list.

In an exemplary embodiment, a user can be prompted to verify the task sender, the task body, and the task date.

The entering the task into the to-do list can include generating a task entry into the to-do list, wherein the entry comprises the task sender, the task body, and the task date. In an exemplary embodiment a transcript of the instant messenger conversation can be appended to the task entry. Also, a link to a file containing a transcript of the instant messenger conversation can be appended to the task entry.

In an exemplary embodiment, an input can be received defining a time period before the task date to begin causing reminder messages to be sent.

An option may be provided to enter the task into a follow up list. The follow up list and the to-do list can be mutually exclusive. Also, a combined task list can be provided that includes the to-do list and the follow up list, wherein tasks from the follow up list are marked differently from tasks from the to-do list.

In an exemplary embodiment, the analyzing the selection of the text can be performed by locating keywords identifying the task sender, the task body, and the task date.

The to-do list can be integrated with a calendar feature of an e-mail program. Furthermore, a message can be sent related to the task to be displayed when the task date arrives.

DETAILED DESCRIPTION OF THE INVENTION

Processes, systems, and computer readable media for providing an auto-generated to-do list are described. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
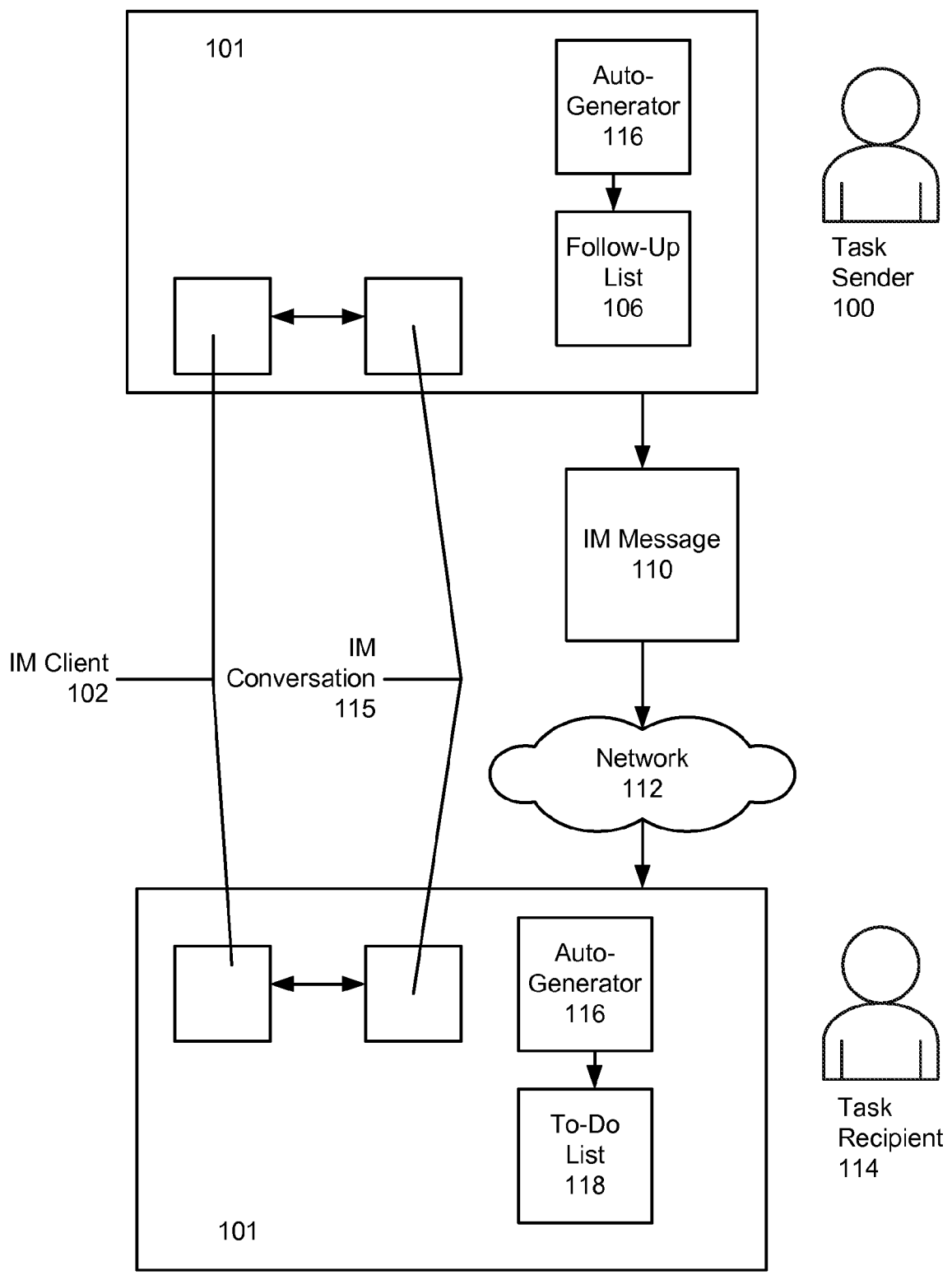
FIG. 1 illustrates an exemplary embodiment of a system wherein an auto-generated to-do list is provided.

FIG. 1 illustrates an exemplary embodiment of a system wherein an auto-generated to-do list is provided. Two or more computers 101 communicate over a network 112. The network 112 may be a public network, such as the Internet, or a private network, such as an intranet, LAN, or WLAN, or a combination of the above. At least a portion of the computers 101 may execute corresponding messaging clients, such as instant messaging ("IM") clients 102. IM clients 102 allow real-time communication between two or more users through the transmissions of messages between the IM clients 102 of the networked computers. IM client 102 can be a stand-alone application on a networked computer 101, or can be integrated into another application used for communication over the network 112, such as an e-mail application or a web browser application.

Each IM message 110 is transmitted from a task sender 100 to one or more addressed task recipients 114. Although IM messages 110 are typically text-based, IM messages 110 may also include voice, digital images, and video. The task sender 100 and the addressed task recipients 114 are typically computers, but can also be any other device used to send and/or receive IM messages, such as a mobile telephone or a hand-held computer. When the IM message 110 is received, it can be appended to IM conversation 115, which can be a transcript including all of the IM messages sent and received by the task sender 100 and the task recipient 114.

According to the exemplary embodiment, an auto-generator 116 for a to-do list 118 is provided that can create task entries in the to-do list 118 from the IM conversation 115. The auto-generator 116 receives text from the IM client 102 and creates entries in the to-do list 118 based upon the contents of the text. In one embodiment, the auto-generator 116 may reside on the same computer as the IM client 102 from which it generates task entries into the to-do list 118.

The to-do list 118 can be a service providing a user's tasks laid out in a chronologically-arranged list. The to-do list 118 can be integrated with a calendar or similar existing feature of an e-mail application or a calendar application, or can be a standalone application. In an exemplary embodiment, the to-do list 118, the IM client 102, and the auto-generator 116 can be part of the same application. In an exemplary embodiment, the to-do list 118 can cause messages to be displayed when a task is due, or in a predetermined amount of time prior to when the task is due. Also, in an exemplary embodiment, the to-do list 118 can cause messages to be displayed when a task is due.

The auto-generator 116 may be implemented in several ways. For example, the auto-generator 116 may be implemented as any of the following: as part of a customized IM client 102; as a plug-in to the IM client 102; as a plug-in to the to-do list 118 (or the application that includes the to-do list 118 as a feature); as an application programming interface (API); or as a stand-alone application. Together, the auto-generator 116 and the to-do list 118 can help a user keep track of tasks assigned to the user, and can provide the user with the context of the task if the user elects to perform the task at a later date.

In an exemplary embodiment, the auto-generator 116 can be configured to provide an option to provide entries into a follow-up list 106. The follow-up list 106 can be used by the task sender 100 to remember the context of the task sent to the task recipient 114 and to follow up when the task is due. The follow-up list 106 can be mutually exclusive from the to-do list, as shown in FIG. 1, or can appear on a combined task list. The combined task list can include the to-do list and the follow-up list, and tasks from the follow up list can be marked differently from tasks from the to-do list.

While the exemplary embodiment shown in FIG. 1 shows an IM system that uses the auto-generator for a to-do list, the auto-generator for a to-do list is not restricted to an IM system environment. In another embodiment, the auto-generator for a to-do list could receive the text from any text-based communication medium (e.g., an e-mail system, or a web message board viewed in a web browser).

Figure 2:
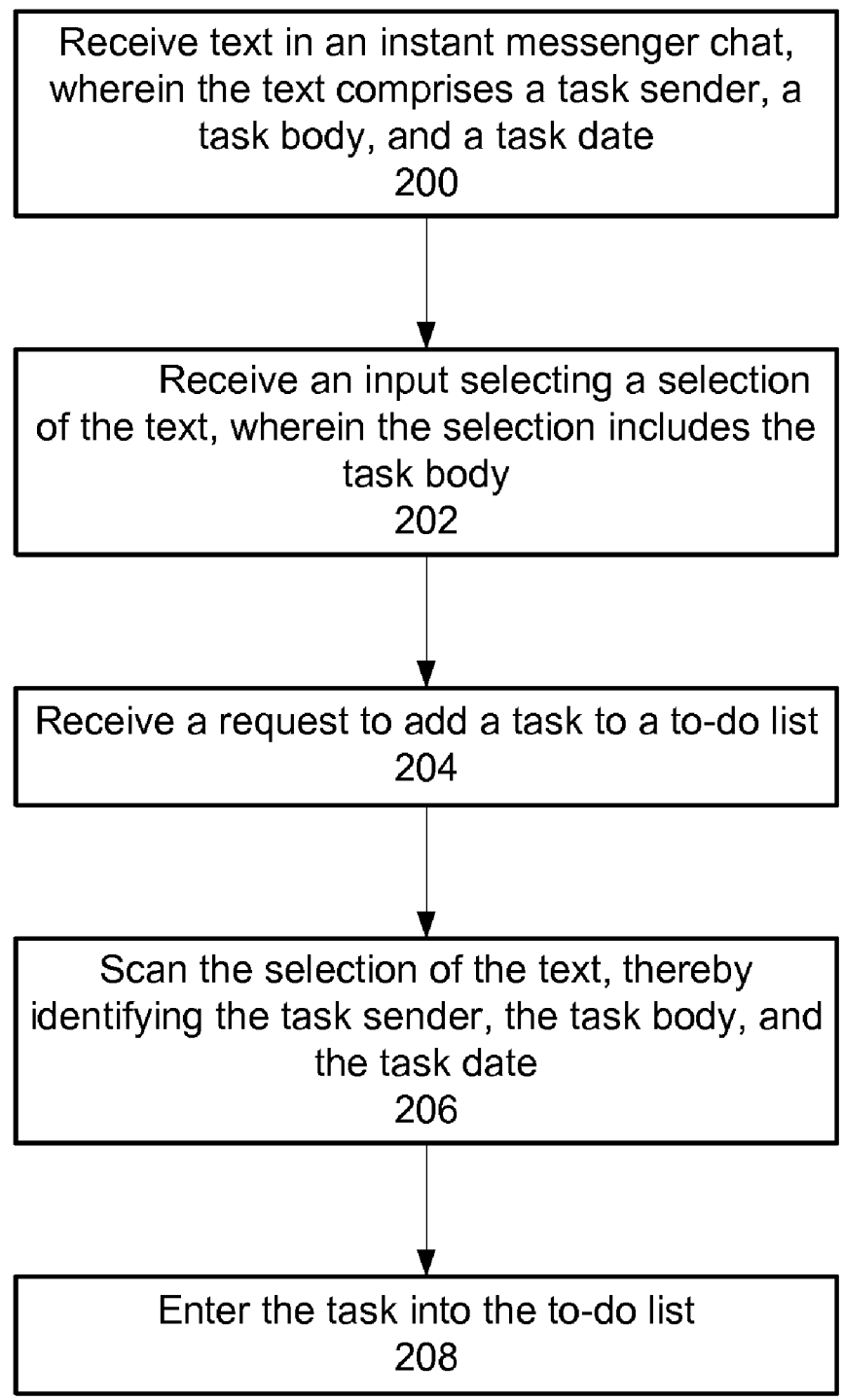
FIG. 2 illustrates an exemplary embodiment of a process for auto-generating a to-do list.

FIG. 2 illustrates an exemplary embodiment of a process for auto-generating a to-do list.

Text is received in an instant messenger chat, wherein the text includes a task sender, a task body, and a task date (block 200). The text can be within the IM conversation 115, for example. The task sender can be the individual that communicates the task to the task recipient 114, and the task sender may be the same or different as the sender of an IM message containing the task body and task date. The task body can be a description of the task that needs to be completed. The task date can be the due date of the task, or another date that is relevant to the completion of the task. The task date can include a time and a date, or can include only a date, and the time for the task can be set at a default, predetermined time (e.g., 9:00 AM of the due date, or 5:00 PM of the due date, or any other suitable time).

An input is received selecting a selection of the text, wherein the selection includes at least the task body (block 202). The selection of the text can include a portion of the text of an IM message or an IM conversation, for example. The selection of the text can also include the task sender and task date, but this is unnecessary, because the task sender and the task date can be determined contextually in certain exemplary embodiments (as discussed below). In an exemplary embodiment, if the task date is not included within the selection of the text, a default setting can be applied whereby the task date is assumed to be the same day the IM message is sent.

While the embodiment shown in FIG. 2 shows receiving a selection of the text, in an exemplary embodiment no text need be selected. Instead, incoming IM messages 110 can be analyzed to determine if their contents include the task body, task sender, and/or task date. In another exemplary embodiment, the IM conversation can be analyzed at a predetermined time (e.g., at regular intervals, or when the IM conversation is closed) to locate the task body, task sender, and/or task date. In such embodiments, the user can be presented with the option to accept, decline or modify the task entry before it is entered into the to-do list. [Is this embodiment OK?]

A request is received to add a task to a to-do list (block 204). The request can be performed, for example, by right clicking on the selection of the text, or by using a drop down menu. The task being added can be described in the task body, can originate from the task sender, and be due at the task date, for example.

The selection of the text is analyzed to identify the task sender, the task body, and the task date (block 206). In an exemplary embodiment, the analyzing the selection of the text is performed by locating keywords identifying the task sender, the task body, and the task date. The keywords can be commonly used phrases or words that indicate the task sender, the task body, and/or the task date. Examples of keywords that can be used to identify the task body include "do," "perform," "need," and the like. Keywords indicating date can be commonly used date formats and nomenclature (e.g., names of days, months, periods of times, etc.). Keywords associated with the task sender can include "for" or "from," for example.

The task sender can be also identified, for example, by searching the selection of the text for a name on a contact list, which can be imported from the IM client or from an e-mail application, for example. Alternatively, the task sender can be identified contextually through the IM client by identifying the individual that sent the IM message containing the task body, for example.

The task is entered into the to-do list, wherein the task comprises the task sender, the task body, and the task date (block 208). After the keywords are located, for example, then the text adjacent to the keywords can be inserted into fields for task sender, task body, and task date respectively, and the task can be stored into the to-do list. In an exemplary embodiment, a task entry is generated into the to-do list, wherein the entry includes the task sender, the task body, and the task date. The task entry can be a discrete page or area in the to-do list dedicated exclusively to the task. The task entry can also be assigned a suggested task title in some embodiments. The task title can be assigned when the selection of the text is analyzed, and can be determined based upon context in some embodiments (e.g., the first sentence of the task body).

A transcript of the IM conversation 115, or a link to a file containing a transcript of the IM conversation 115 may be appended to the task entry. Allowing a user to have immediate access to the entire IM conversation 115 can be advantageous because the user may want to remember the context under which the task was assigned. Using a link to a separate file can be advantageous because it can prevent the task entry from becoming cluttered with potentially irrelevant material from the IM conversation 115.

Figure 3:
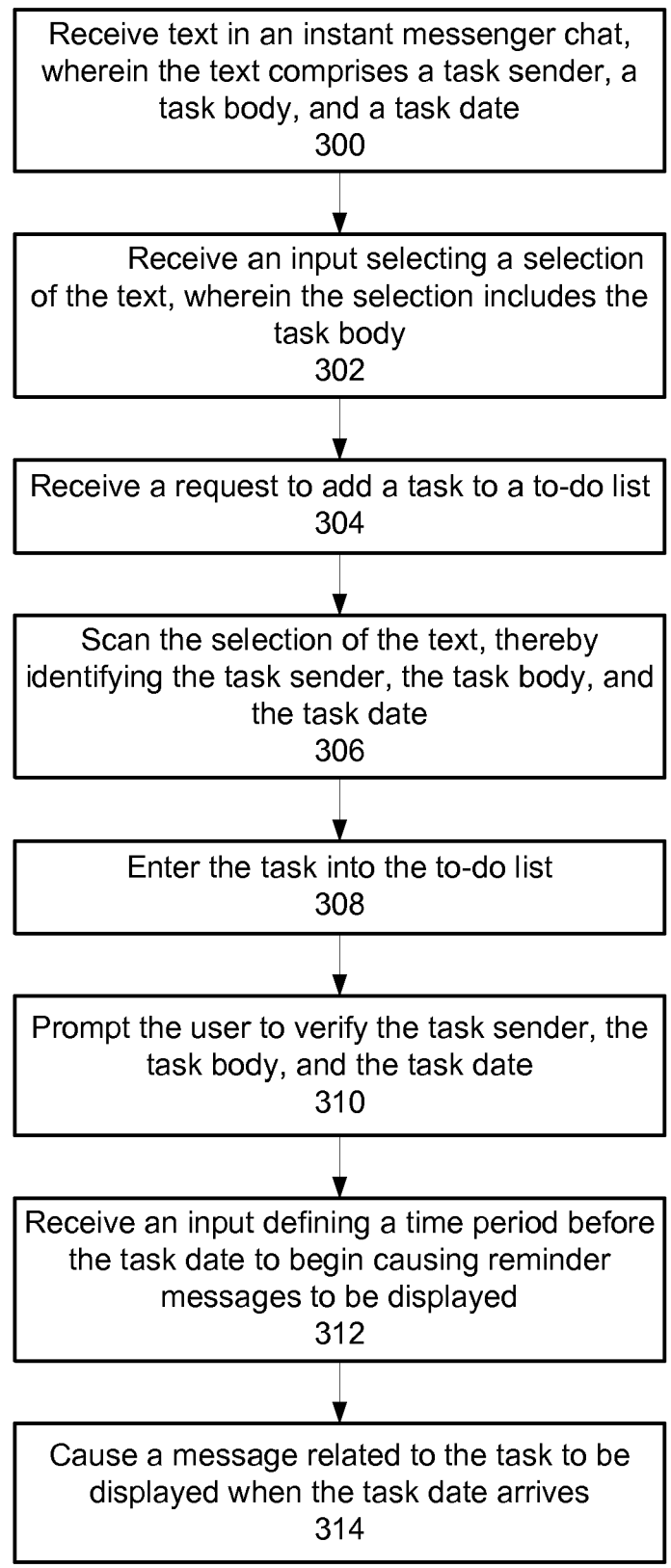
FIG. 3 illustrates another exemplary embodiment of a process for auto-generating a to-do list.

FIG. 3 illustrates another exemplary embodiment of a process for auto-generating a to-do list. Blocks 300-308 function essentially in the same way as blocks 200-208 from FIG. 2.

The user can be prompted to verify the task sender, the task body, and the task date (block 310). At this step, the user can opt to change any of the task sender, the task body, the task date, and, if applicable, the task title to better suit the user's preferences.

An input can be received defining a time period before the task date to begin causing reminder messages to be displayed (block 312). This can be advantageous in situations where the user would prefer to be reminded before the task date that the task needs to be performed.

A message related to the task to can be displayed when the task date arrives (block 314). The message can include information descriptive of the task (e.g., the task title, or the task body). Displaying such messages can be advantageous because it can permit the user to be aware that the task is due without requiring the user to view the to-do list.

While the process shown in FIG. 3 is described with respect to a task entry in a to-do list, it is equally applicable to embodiments where a follow-up list is used instead of the to-do list. The auto-generation of task entries functions essentially in the same manner in follow-up list embodiments.

In an exemplary embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain steps. However, the method and system operate effectively for other methods having different and/or additional steps not inconsistent with the present invention.

A method and system for providing an auto-generated to-do list has been described. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

We claim:

1. A method for providing an auto-generated to-do list, comprising:

receiving, by a device, text in an instant messenger conversation, wherein the text comprises a task sender, a task body, and a task date;

receiving, by the device, an input selecting a selection of the text, wherein the selection comprises the task body;

analyzing, by the device, the selection of the text to identify the task sender, the task body, and the task date; and entering, by the device, a task into a to-do list, wherein the task comprises the task sender, the task body, and the task date.

2. The method of claim 1 further comprising receiving a request to add the task to the to-do list.

3. The method of claim 1 further comprising prompting a user to verify the task sender, the task body, and the task date after analyzing the selection of the text.

4. The method of claim 1 wherein the entering the task into the to-do list comprises generating a task entry into the to-do list, wherein the entry comprises the task sender, the task body, and the task date.

5. The method of claim 4 further comprising appending a transcript of the instant messenger conversation to the task entry.

6. The method of claim 4 further comprising appending a link to a file containing a transcript of the instant messenger conversation to the task entry.

7. The method of claim 1 further comprising receiving an input defining a time period before the task date to begin causing reminder messages to be sent.

8. The method of claim 7 wherein the follow up list and the to-do list are mutually exclusive.

9. The method of claim 7 wherein a combined task list comprises the to-do list and the follow up list, wherein tasks from the follow up list are marked differently from tasks from the to-do list.

10. The method of claim 1 further comprising providing an option to enter the task into a follow up list.

11. The method of claim 1 wherein the analyzing the selection of the text comprises locating keywords identifying the task sender, the task body, and the task date.

12. The method of claim 1 wherein the to-do list is integrated with a calendar feature of an e-mail application.

13. The method of claim 1 further comprising causing a message related to the task to be displayed when the task date arrives.

14. A system for auto-generating entries into a to-do list, comprising:

memory;

a processor coupled to the memory; and an auto-generator executable on the processor, wherein the auto-generator is configured to:

receive text in an instant messenger conversation, wherein the text comprises a task sender, a task body, and a task date;

receive an input selecting a selection of the text, wherein the selection comprises the task body;

analyze the selection of the text to identify the task sender, the task body, and the task date; and enter a task into the to-do list, wherein the task comprises the task sender, the task body, and the task date.

15. The system of claim 14 wherein the auto-generator is further configured to receive a request to add the task to the to-do list.

16. The system of claim 14 wherein the auto-generator is further configured to prompt a user to verify the task sender, the task body, and the task date after analyzing the selection of the text.

17. The system of claim 14 wherein the task is entered into the to-do list by generating a task entry into the to-do list, wherein the entry comprises the task sender, the task body, and the task date.

18. The system of claim 17 wherein the auto-generator is further configured to append a transcript of the instant messenger conversation to the task entry.

19. The system of claim 14 wherein the auto-generator is further configured to append a link to a file containing a transcript of the instant messenger conversation to the task entry.

20. The system of claim 14 wherein the auto-generator is further configured to receive an input defining a time period before the task date to begin causing reminder messages to be sent.

21. The system of claim 14 wherein the auto-generator is further configured to provide an option to enter the task into a follow up list.

22. The system of claim 21 wherein the follow up list and the to-do list are mutually exclusive.

23. The system of claim 21 wherein a combined task list comprises the to-do list and the follow up list, wherein tasks from the follow up list are marked differently from tasks from the to-do list.

24. The system of claim 14 wherein the auto-generator is configured to scan the selection of the text by locating keywords identifying the task sender, the task body, and the task date.

25. The system of claim 14 wherein the to-do list is integrated with a calendar feature of an e-mail application.

26. The system of claim 14 wherein the auto-generator is further configured to cause a message related to the task to be displayed when the task date arrives.

27. An executable software product stored on a non-transitory computer-readable medium containing program instructions for providing an auto-generated to-do list, the program instructions for:
  receiving text in an instant messenger conversation, wherein the text comprises a task sender, a task body, and a task date;
  receiving an input selecting a selection of the text, wherein the selection comprises the task body;
  analyzing the selection of the text to identify the task sender, the task body, and the task date; and
  entering a task into the to-do list, wherein the task comprises the task sender, the task body, and the task date.

28. The executable software product of claim 27 further comprising program instructions for prompting a user to verify the task sender, the task body, and the task date after analyzing the selection of the text.

29. The executable software product of claim 27 wherein the program instructions for entering the task into the to-do list comprise program instructions for generating a task entry into the to-do list, wherein the entry comprises the task sender, the task body, and the task date.

30. The executable software product of claim 29 further comprising program instructions for appending a transcript of the instant messenger conversation to the task entry.

31. The executable software product of claim 27 further comprising program instructions for receiving an input defining a time period before the task date to begin causing reminder messages to be sent.

32. The executable software product of claim 27 wherein the program instructions for analyzing the selection of the text comprise program instructions for locating keywords identifying the task sender, the task body, and the task date.

33. The executable software product of claim 27 further comprising program instructions for causing a message related to the task to be displayed when the task date arrives.

34. An apparatus comprising:
  a processor; and
  an auto-generator executable o the processor, the auto-generator is configured to:
    receive text from a text-based communication medium, wherein the text comprises a task sender, a task body, and a task date;
    receive an input selecting a selection of the text, wherein the selection comprises the task body;
    scan the text, thereby identifying the task sender, the task body, and the task date; and
    enter a task into a to-do list, wherein the task comprises the task sender, the task body, and the task date.

35. A computer-implemented method for providing an auto-generated to-do list, comprising:
  receiving, by a device, text in an instant messenger conversation, wherein the text comprises a task sender, a task body, and a task date;
  analyzing, by the device, the text to identify the task sender, the task body, and the task date; and
  entering, by the device, a task into a to-do list, wherein the task comprises the task sender, the task body, and the task date.

* * * * *